United States Patent [19]
Pickett et al.

[11] Patent Number: 5,926,646
[45] Date of Patent: Jul. 20, 1999

[54] CONTEXT-DEPENDENT MEMORY-MAPPED REGISTERS FOR TRANSPARENT EXPANSION OF A REGISTER FILE

[75] Inventors: James K. Pickett; Rupaka Mahalingaiah, both of Austin; Brian D. McMinn, Buda, all of Tex.

[73] Assignee: Advanced Micro Devices, Inc., Sunnyvale, Calif.

[21] Appl. No.: 08/927,337

[22] Filed: Sep. 11, 1997

[51] Int. Cl.$^6$ .............................. G06F 9/32; G06F 12/06
[52] U.S. Cl. ...................... 395/800.32; 395/678; 711/202
[58] Field of Search ........................ 395/800.37, 800.42, 395/595, 698, 387, 569, 598, 823, 800.32; 711/1, 106, 5, 202; 364/770, DIG. 1, DIG. 2

[56] References Cited

U.S. PATENT DOCUMENTS

| | | | |
|---|---|---|---|
| 4,829,425 | 5/1989 | Bain, Jr. et al. | 711/202 |
| 5,384,724 | 1/1995 | Jagini | 364/770 |
| 5,727,211 | 3/1998 | Gulsen | 395/678 |

OTHER PUBLICATIONS

Intel, *Pentium™ Processor User's Manual*, vol. 3: "Architectures and Programming Manual," Chapter 13, "Protected–Mode Multitasking," pp. 13–1 through 13–15, 1993.

*Primary Examiner*—Daniel H. Pan
*Attorney, Agent, or Firm*—Conley, Rose & Tayon; Lawrence J. Merkel; B. Noel Kivlin

[57] ABSTRACT

A microprocessor includes an expanded set of registers in addition to the architected set of registers specified by the microprocessor architecture employed by the microprocessor. The expanded set of registers are memory-mapped within the context of the program being executed. Upon a context switch, the microprocessor saves the state of the expanded registers to the corresponding memory locations. An application program may make use of the expanded registers by assigning the most-often used operands in the program to the set of memory locations corresponding to the expanded registers. The application programmer may than code instructions which access these operands with register identifiers corresponding to the expanded registers. In one embodiment, the microprocessor implements a portion of the expanded registers instead of the entire set of expanded registers. The implemented portion of the expanded registers are accessed as register accesses, while the unimplemented portion are converted to memory accesses. The decode unit within the microprocessor may be configured to convert instructions which are coded to access the unimplemented expanded registers into memory operations to access the corresponding memory location.

40 Claims, 11 Drawing Sheets

Base Address
252

| 0 | Link |
|---|---|
| ESP0 ||
| 0 | SS0 |
| ESP1 ||
| 0 | SS1 |
| ESP2 ||
| 0 | SS2 |
| CR3 ||
| EIP ||
| EFLAGS ||
| EAX ||
| ECX ||
| EDX ||
| EBX ||
| ESP ||
| EBP ||
| ESI ||
| EDI ||
| 0 | ES |
| 0 | CS |
| 0 | SS |
| 0 | DS |
| 0 | FS |
| 0 | GS |
| 0 | LDT Selector |
| I/O Map Base Address | 0 | T |

CONTEXT-DEPENDENT MEMORY-MAPPED REGISTERS FOR TRANSPARENT EXPANSION OF A REGISTER FILE

BACKGROUND OF THE INVENTION

1. Field of the Invention

This invention is related to the field of microprocessors and, more particularly, to expanding register files within microprocessors.

2. Description of the Related Art

Modern microprocessors are demanding decreasing memory latency to support the increased performance achievable by the microprocessors. Increasing clock frequencies (i.e. shortening clock cycles) employed by the microprocessors allow for more data and instructions to be processed per second, thereby requiring decreased latency to support maximum performance. Furthermore, modern microprocessor microarchitectures are improving the efficiency at which the microprocessor can process data and instructions. Decreased latency requirements are even further advanced due to the improved processing efficiency.

Computer systems typically have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data then may be achieved from a disk storage, for example. However, the access times of modern DRAMs are significantly longer than the clock cycle length of modern microprocessors. The memory access time for each set of bytes being transferred to the microprocessor is therefore long. Accordingly, the main memory system is not a low latency system. Microprocessor performance may suffer due to the high memory latency.

One way to achieved decreased memory latency is to provide registers within the microprocessor. As used herein, a register is a storage location provided within the microprocessor which may be identified by an instruction as storing an operand. In other words, a register is "programmer visible": the programmer may code an instruction which has the register as an operand identifier (or operand address). The value stored in the register may be used as an operand ("direct addressing"), or may be used to form a memory address identifying a memory location at which the operand is stored ("indirect addressing"). The term "operand" refers to a value operated upon or generated by an instruction. A source operand is a value operated upon by an instruction (i.e. is an input to the operation defined by the instruction). A destination operand is a value generated by the instruction (i.e. is an output of the operation defined by the instruction). Either source or destination operands may be stored in registers according to various instruction encodings.

Since registers are included within the microprocessor and the register address is coded directly into an instruction, registers can be accessed rapidly. For example, in modern microprocessors registers can typically still be accessed in one clock cycle, while even caches are beginning to require multiple clock cycles to access. Operands may be stored in registers to reduce the latency for access to those operands. Values stored in memory locations may be loaded into registers for manipulation by instructions. After manipulation by a number of instructions, resulting values may be stored to memory locations. Advantageously, often-used operands may be stored in registers and therefore require fewer memory accesses during the manipulation of the often-used operands. Latency in accessing these operands is thereby decreased, even though memory latency is unchanged.

Because registers can be coded into instructions as operand specifiers, the number and size of registers is generally determined by the microprocessor architecture implemented by a particular microprocessor. The microprocessor architecture defines the instruction set executed by the microprocessor, as well as programmer visible resources such as registers. Furthermore, operation of the microprocessor during context switches is often specified. A context is the set of values (in registers and other microprocessor state, for example) which forms the environment in which a program executes. Just prior to the execution of a particular instruction within a program, the context reflects the results of executing each prior instruction within the program. If a context switch is initiated at the particular instruction so that, for example, another program or routine may be executed, then the context is saved to a predetermined memory location so that the next instruction may be executed upon a return to the context and the same result will be generated as if the context switch had not occurred. The context save may be performed by the microprocessor hardware, may be the responsibility of software, or may be shared between both. As used herein, a context switch is an event in which one context, corresponding to a first program, is replaced within the microprocessor by another context corresponding to a second program.

Since registers are part of the context of the microprocessor, the registers are generally saved during a context switch. Unfortunately, the inclusion of registers in the context makes increasing the number of registers to decrease operand access latency difficult. The context save operation as well as the context storage must be modified, impacting both hardware and software (particularly operating system software). A method for increasing the number of registers without impacting the context is desired.

SUMMARY OF THE INVENTION

The problems outlined above are in large part solved by a microprocessor in accordance with the present invention. The microprocessor includes an expanded set of registers in addition to the architected set of registers specified by the microprocessor architecture employed by the microprocessor. The expanded set of registers are memory-mapped within the context of the program being executed. Upon a context switch, the microprocessor saves the state of the expanded registers to the corresponding memory locations. Advantageously, the context save area defined by the microprocessor architecture is not modified by adding the provided registers. Additionally, since the microprocessor manages the save and restore of the expanded registers upon context switches, the addition of the expanded registers is transparent to operating system software.

An application program may make use of the expanded registers by assigning the most-often used operands in the program to the set of memory locations corresponding to the expanded registers. The application programmer may than code instructions which access these operands with register identifiers corresponding to the expanded registers. Advantageously, the most often-used operands may be accessed as register accesses instead of memory accesses. Operand access latency may thereby be reduced.

In one embodiment, the microprocessor implements a portion of the expanded registers instead of the entire set of expanded registers. The implemented portion of the expanded registers are accessed as register accesses, while the unimplemented portion are converted to memory accesses. The decode unit within the microprocessor may be configured to convert instructions which are coded to access the unimplemented expanded registers into memory operations to access the corresponding memory location. Advantageously, a relatively large number of expanded registers may be defined even if a smaller number of expanded registers are implementable in a present version of the microprocessor.

Broadly speaking, the present invention contemplates a microprocessor comprising a register file and a control unit. The register file includes a first set of registers and a second set of registers. The second set of registers are mapped to a set of consecutive memory locations within a memory space of the microprocessor. The control unit is configured, during a context switch, to store the first set of registers into a context save area defined by a context base address and to store the second set of registers into the set of consecutive memory locations. The set of consecutive memory locations are separate from the context save area.

The present invention further contemplates a microprocessor comprising a register file and a decode unit coupled thereto. The register file includes a first set of registers and a first portion of a second set of registers. The second set of registers are mapped to a set of consecutive memory locations within a memory space of the microprocessor. The decode unit is configured, upon decode of a first instruction coded to access one of the first portion of the second set of registers, to generate a read request to the register file for the one of the first portion of the second set of registers. Additionally, the decode unit is configured, upon decode of a second instruction coded to access one of a remaining portion of the second set of registers, to generate a memory operation having an address corresponding to one of the set of consecutive memory locations, wherein the one of the set of consecutive memory locations corresponds to the one of the remaining portion of the second set of registers.

The present invention still further contemplates a method for accessing a set of memory-mapped registers in a microprocessor which implements a first portion of the set of memory-mapped registers and does not implement a remaining portion of the set of memory-mapped registers. An instruction having an operand stored in one of the set of memory-mapped registers is decoded. The one of the set of memory-mapped registers is accessed within the microprocessor in response to the one of the set of memory-mapped registers being one of the first portion of the set of memory-mapped registers. Alternatively, the one of the set of memory-mapped registers is accessed from a corresponding memory location to which the one of the set of memory-mapped registers is mapped in response to the one of the set of memory-mapped registers being one of the remaining portion of the set of memory-mapped registers.

BRIEF DESCRIPTION OF THE DRAWINGS

Other objects and advantages of the invention will become apparent upon reading the following detailed description and upon reference to the accompanying drawings in which:

FIG. 12 is a diagram illustrating one embodiment of a context save area.

Figure 1:
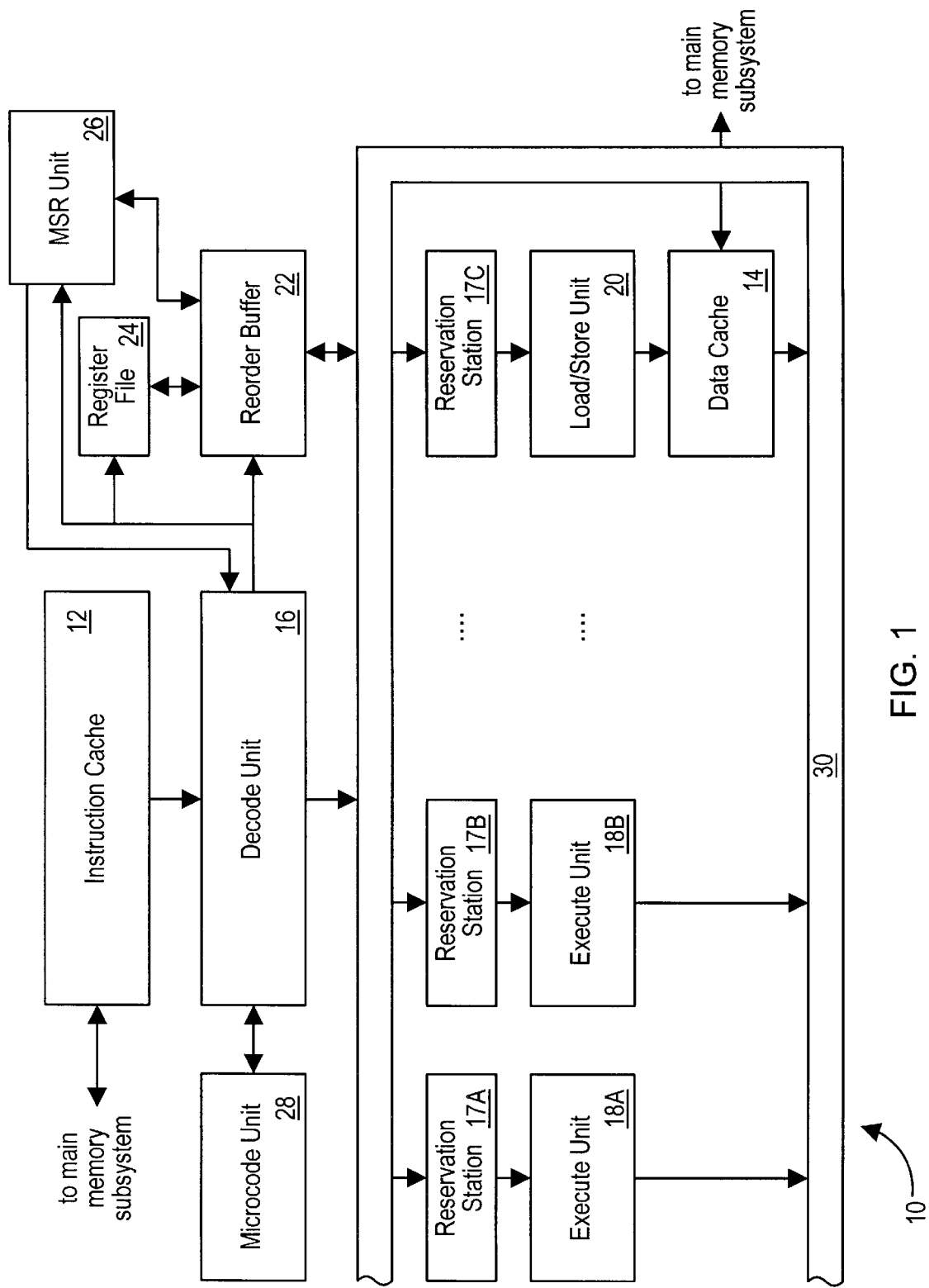
FIG. 1 is a block diagram of one embodiment of a microprocessor including a register file.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes an instruction cache 12, a data cache 14, a decode unit 16, a plurality of reservation stations including reservation stations 17A, 17B, and 17C, a plurality of execute units including execute units 18A and 18B, a load/store unit 20, a reorder buffer 22, a register file 24, a model specific register (MSR) unit 26, and a microcode unit 28. Elements referred to herein with a particular reference number followed by a letter will be collectively referred to by the reference number alone. For example, the plurality of execute units will be collectively referred to herein as execute units 18. Execute units 18 may include more execute units than execute units 18A and 18B shown in FIG. 1. Additionally, an embodiment of microprocessor 10 may include one execute unit 18.

As shown in FIG. 1, instruction cache 12 is coupled to a main memory subsystem (not shown) and to a decode unit 16, which is further coupled to reservation stations 17, reorder buffer 22, register file 24, MSR unit 26, and microcode unit 28. Reorder buffer 22, execute units 18, and data cache 14 are each coupled to a result bus 30 for forwarding of execution results. Furthermore, each reservation station 17A and 17B is coupled to a respective execute unit 18A and 18B, while reservation station 17C is coupled to load/store unit 20. Each reservation station 17 is coupled to receive operand information from reorder buffer 22. Load/store unit 20 is coupled to data cache 14, which is further coupled to the main memory subsystem. Finally, MSR unit 26 and register file 24 are coupled to reorder buffer 22. It is understood than many different microprocessor embodiments are possible within the spirit and scope of the present disclosure.

Generally speaking, register file 24 includes storage locations corresponding to each of the architected registers (i.e. the registers defined by the microprocessor architecture employed by microprocessor 10). Additionally, register file 24 includes storage for a plurality of expanded registers (i.e. registers provided by microprocessor 10 in addition to the architected registers). The expanded registers are programmer visible, and can be coded as operands of an expanded set of instructions employed by microprocessor 10. The expanded set of instructions includes the architected instruction set as well as additional instructions which access the expanded registers. The additional instructions may be defined using the unused opcodes in the microprocessor architecture. Additionally, instruction formats for the new instructions may be defined as desired. For example, the x86 architecture uses a two operand architecture in which one operand is a source and the other operand is a destination as well as often being a source. A three operand addressing format may be desired in which two source operands and a destination operand are defined.

The expanded set of registers are memory-mapped. As used herein, a register is memory-mapped if a memory location is assigned to the register for storing the value stored in the register. Upon a context switch, microprocessor 10 stores the expanded registers into the corresponding memory locations. The register values are thereby saved for later restoration when a return to the context is performed. Advantageously, the values stored in the expanded registers are preserved within the context in which they are formed. The memory locations are part of the memory allocated to the program executing within the context. Therefore, no modifications are made to the context save area defined by the microprocessor architecture. Since microprocessor 10 automatically handles the save and restore of the expanded registers during a context switch, the added registers are transparent to operating system software. Therefore, application programs may be written to take advantage of the expanded registers even though the operating system (which is often slower to make changes corresponding to hardware changes) may not be aware of the registers.

According to one embodiment, the memory locations assigned to the expanded registers form a set of contiguous memory locations identified by a base address. From the programmer's point of view, the set of contiguous memory locations may be used as storage for the most-frequently accessed operands (e.g. variables within the program). These operands may therefore be stored in the memory-mapped registers (and accessed therefrom), and the memory locations may be updated upon context switches.

According to one embodiment, microprocessor 10 is configured to reassign the operation performed by a given instruction when an instruction redefinition mode is enabled. Microprocessor 10 employs a model specific register (MSR) within MSR unit 26 for storing an indication of the instructions which are redefined and the operation which those instructions are redefined to perform. The instructions which are redefinable ("redefinable instructions") may be preselected from the set of seldom-used instructions (e.g. privileged instructions and instructions whose corresponding architecturally defined operation is seldom used). The redefinable instructions may be defined as performing the same operation as other instructions, but using the expanded registers as operands. Alternatively, the most often used instructions may be selected as redefinable, wherein the redefinition comprises using the expanded registers as operands instead of the architected registers. A field within the MSR corresponds to each of the redefinable instructions. Using a write MSR instruction, an application program can redefine an instruction to access the expanded registers instead of the architected registers. Advantageously, new registers can be accessed by instructions within the instruction set without consuming the undefined opcodes (if any).

As opposed to preselecting the instructions to be redefined, microprocessor 10 may instead allow for storage of the opcodes corresponding to the instructions selected for redefinition. In this manner, the application itself may determine which instructions are redefinable instructions. Alternatively, a bit within the MSR may be assigned to each opcode. The application may thereby determine which instructions are remapped by setting the corresponding bit. Furthermore, preselected groups of instructions may be assigned to a particular bit.

Decode unit 16 is coupled to receive signals from MSR unit 26 which represent the instruction redefinitions. For each instruction which microprocessor 10 allows to be redefined, decode unit 16 produces a first decoded instruction which causes execute units 18 and/or load/store unit 20 to access the architecturally defined registers if the signals indicate that the instruction has not been redefined via an update to the corresponding MSR. Alternatively, decode unit 16 produces a second decoded instruction which causes execute units 18 and/or load/store unit 20 to access the expanded registers if the signals indicate that the instruction has been redefined via an update to the corresponding MSR. According to one embodiment, instruction redefinition is enabled via a redefinition enable flag stored in a status flags register. If the redefinition enable flag is not set, then the signals from MSR unit 26 are ignored by decode unit 16 and decode unit 16 produces the first decoded instruction. Alternatively, execute units 18 may be coupled to receive the signals from MSR unit 26 and may change execution of the instruction in response to those signals.

According to one embodiment, predecode data may be stored in instruction cache 12 along with each instruction cache line. The predecode data may be used to more quickly decode and dispatch instructions by providing a portion of the decode operation prior to storing instructions in the instruction cache. In one embodiment, a predecode bit is stored with each cache line indicating whether or not instruction redefinition mode is in use when the cache line is fetched and executed. The predecode bit can be speculatively generated by either using the current value of the instruction redefinition enable flag or by detecting updates to the redefinition enable flag in the instructions being predecoded. In this manner, decode unit 16 can speculatively determine if instruction redefinition mode should be assumed for a group of instructions being dispatched. Decoded instructions may thereby be speculatively generated and dispatched. If the assumed redefinition mode is found to be incorrect, the speculative instructions may be discarded. Subsequently, the cache line can be refetched and decoded correctly.

In embodiments in which register file 24 embodies all of the expanded registers, the second decoded instruction produced by decode unit 16 may be similar to the first decoded instruction produced by decode unit 16 except for the registers indicated as accessed by decode unit 16 to register file 24 and reorder buffer 22. Alternatively, in embodiments in which register file 24 implements some but not all of the expanded registers, the second decoded instruction includes load/store memory operations for the unimplemented expanded registers accessed by the instruction as well as the registers indicated as accessed by decode unit 16 to register file 24 and reorder buffer 22. Additional details regarding the partial implementation of the expanded registers is provided further below.

MSR unit 26 comprises a plurality of model specific registers. Generally speaking, model specific registers are used to control features which are part of the implementation of microprocessor 10 but which are not part of the microprocessor architecture employed by microprocessor 10. For example, debug features supported by microprocessor 10 may be controlled by model specific registers. Additionally, performance monitoring features may be controlled via model specific registers. According to the present embodiment of microprocessor 10, a model specific register is assigned to store instruction redefinition controls.

According to one embodiment, microprocessor 10 employs the x86 microprocessor architecture. The x86 microprocessor architecture employs MSRs, with a RDMSR instruction for reading the MSRs and a WRMSR instruction for writing the MSRs. The RDMSR and WRMSR instructions are defined as privileged instructions in the x86 microprocessor architecture. Microprocessor 10, on the other hand, does not treat the RDMSR and WRMSR instructions as privileged if the MSR being updated is the MSR which stores instruction redefinition information. If that MSR is being updated or read, the WRMSR or RDMSR instruction is executed as nonprivileged. Otherwise, the instruction is executed as privileged. Although the x86 microprocessor architecture is employed by one embodiment of microprocessor 10, other embodiments may employ different microprocessor architectures.

Instruction cache 12 is a high speed cache memory for storing instructions. It is noted that instruction cache 12 may be configured into a set-associative or direct mapped configuration. Instruction cache 12 may additionally include a branch prediction mechanism for predicting branch instructions as either taken or not taken. Instructions are fetched from instruction cache 12 and conveyed to decode unit 16 for decode and dispatch to a reservation station 17.

Decode unit 16 decodes each instruction fetched from instruction cache 12. Decode unit 16 dispatches the instruction to one or more of reservation stations 17 depending upon the type of instruction detected. More particularly, decode unit 16 produces a decoded instruction in response to each instruction fetched from instruction cache 12. The decoded instruction comprises control signals to be used by execute units 18 and/or load/store unit 20 to execute the instruction. For example, if a given instruction includes a memory operand, decode unit 16 may signal load/store unit 20 to perform a load/store memory operation in response to the given instruction.

Decode unit 16 also detects the register operands used by the instruction and requests these operands from reorder buffer 22 and register file 24. In one embodiment, execute units 18 are symmetrical execution units. Symmetrical execution units are each configured to execute a particular subset of the instruction set employed by microprocessor 10. The subsets of the instruction set executed by each of the symmetrical execution units are the same. In another embodiment, execute units 18 are asymmetrical execution units configured to execute dissimilar instruction subsets. For example, execute units 18 may include a branch execute unit for executing branch instructions, one or more arithmetic/logic units for executing arithmetic and logical instructions, and one or more floating point units for executing floating point instructions. Decode unit 16 dispatches an instruction to a reservation station 17 which is coupled to an execute unit 18 or load/store unit 20 which is configured to execute that instruction.

Microcode unit 28 is included for handling instructions for which the architecturally defined operation is more complex than the hardware employed within execute units 18 and load/store unit 20 may handle. Microcode unit 28 parses the complex instruction into multiple instructions which execute units 18 and load/store unit 20 are capable of executing. Additionally, microcode unit 28 may perform functions employed by microprocessor 10. For example, microcode unit 28 may perform instructions which represent a context switch. Microcode unit 28 causes the context stored within microprocessor 10 to be saved to memory at a predefined memory location referred to as the "context save area" (according to the microprocessor architecture employed by microprocessor 10) and restores the context of the program being initiated. Additionally, microcode unit 28 causes the memory-mapped registers to be stored into the corresponding memory locations as defined by the base address of the memory-mapped storage area. Additional details regarding one embodiment of microcode unit 28 are provided below.

Load/store unit 20 provides an interface between execute units 18 and data cache 14. Load and store memory operations are performed by load/store unit 20 to data cache 14. Additionally, memory dependencies between load and store memory operations are detected and handled by load/store unit 20. As used herein, a memory operation is a transfer of a value between a memory location and microprocessor 10. A load memory operation is a transfer of the value from the memory location to microprocessor 10, while a store memory operation is a transfer of the value from microprocessor 10 to the memory location. A memory location is one storage location within a memory coupled to microprocessor 10. Each memory location is identified via a different address within an address space defined by microprocessor 10.

Reservation stations 17 are configured to store instructions whose operands have not yet been provided. An instruction is selected from those stored in a reservation station 17A–17C for execution if: (1) the operands of the instruction have been provided, and (2) the instructions within the reservation station 17A–17C which are prior to the instruction being selected in program order have not yet received operands. It is noted that a centralized reservation station may be included instead of separate reservations stations. The centralized reservation station is coupled between decode unit 16, execute units 18, and load/store unit 20. Such an embodiment may perform the dispatch function within the centralized reservation station.

Microprocessor 10 supports out of order execution, and employs reorder buffer 22 for storing execution results of speculatively executed instructions and storing these results into register file 24 in program order, for performing dependency checking and register renaming, and for providing for mispredicted branch and exception recovery. When an instruction is decoded by decode unit 16, requests for register operands are conveyed to reorder buffer 22 and register file 24. In response to the register operand requests, one of three values is transferred to the reservation station 17A–17C which receives the instruction: (1) the value stored in reorder buffer 22, if the value has been speculatively generated; (2) a tag identifying a location within reorder buffer 22 which will store the result, if the value has not been speculatively generated; or (3) the value stored in the register within register file 24, if no instructions within reorder buffer 22 modify the register. Additionally, a storage location within reorder buffer 22 is allocated for storing the results of the instruction being decoded by decode unit 16. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 18 or load/store unit 20 execute an instruction, the tag assigned to the instruction by reorder buffer 22 is conveyed upon result bus 30 along with the result of the instruction. Reorder buffer 22 stores the result in the indicated storage location. Additionally, reservation stations 17 compare the tags conveyed upon result bus 30 with tags of operands for instructions stored therein. If a match occurs, the unit captures the result from result bus 30 and stores it with the corresponding instruction. In this manner, an instruction may receive the operands it is intended to operate upon. Capturing results from result bus 30 for use by instructions is referred to as "result forwarding".

Instruction results are stored into register file 24 by reorder buffer 22 in program order. Storing the results of an instruction and deleting the instruction from reorder buffer 22 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 22 discards the instructions subsequent to the mispredicted branch instructions. Instructions thus discarded are also flushed from reservation stations 17, execute units 18, load/store unit 20, and decode unit 16.

Register file 24 includes storage locations for each register defined by the microprocessor architecture employed by microprocessor 10. For example, microprocessor 10 may employ the x86 microprocessor architecture. For such an embodiment, register file 24 includes locations for storing the EAX, EBX, ECX, EDX, ESI, EDI, ESP, and EBP register values. Furthermore, register file 24 includes storage locations corresponding to the implemented memory-mapped registers.

Data cache 14 is a high speed cache memory configured to store data to be operated upon by microprocessor 10. It is noted that data cache 14 may be configured into a set-associative or direct-mapped configuration.

The main memory subsystem effects communication between microprocessor 10 and devices coupled thereto. For example, instruction fetches which miss instruction cache 12 may be transferred from a main memory by the main memory subsystem. Similarly, data requests performed by load/store unit 20 which miss data cache 14 may be transferred from main memory by the main memory subsystem. Additionally, data cache 14 may discard a cache line of data which has been modified by microprocessor 10. The main memory subsystem transfers the modified line to the main memory.

It is noted that decode unit 16 may be configured to dispatch an instruction to more than one execution unit. For example, in embodiments of microprocessor 10 which employ the x86 microprocessor architecture, certain instructions may operate upon memory operands. Executing such an instruction involves transferring the memory operand from data cache 14, executing the instruction, and transferring the result to memory (if the destination operand is a memory location). Load/store unit 20 performs the memory transfers, and an execute unit 18 performs the execution of the instruction.

Figure 2:
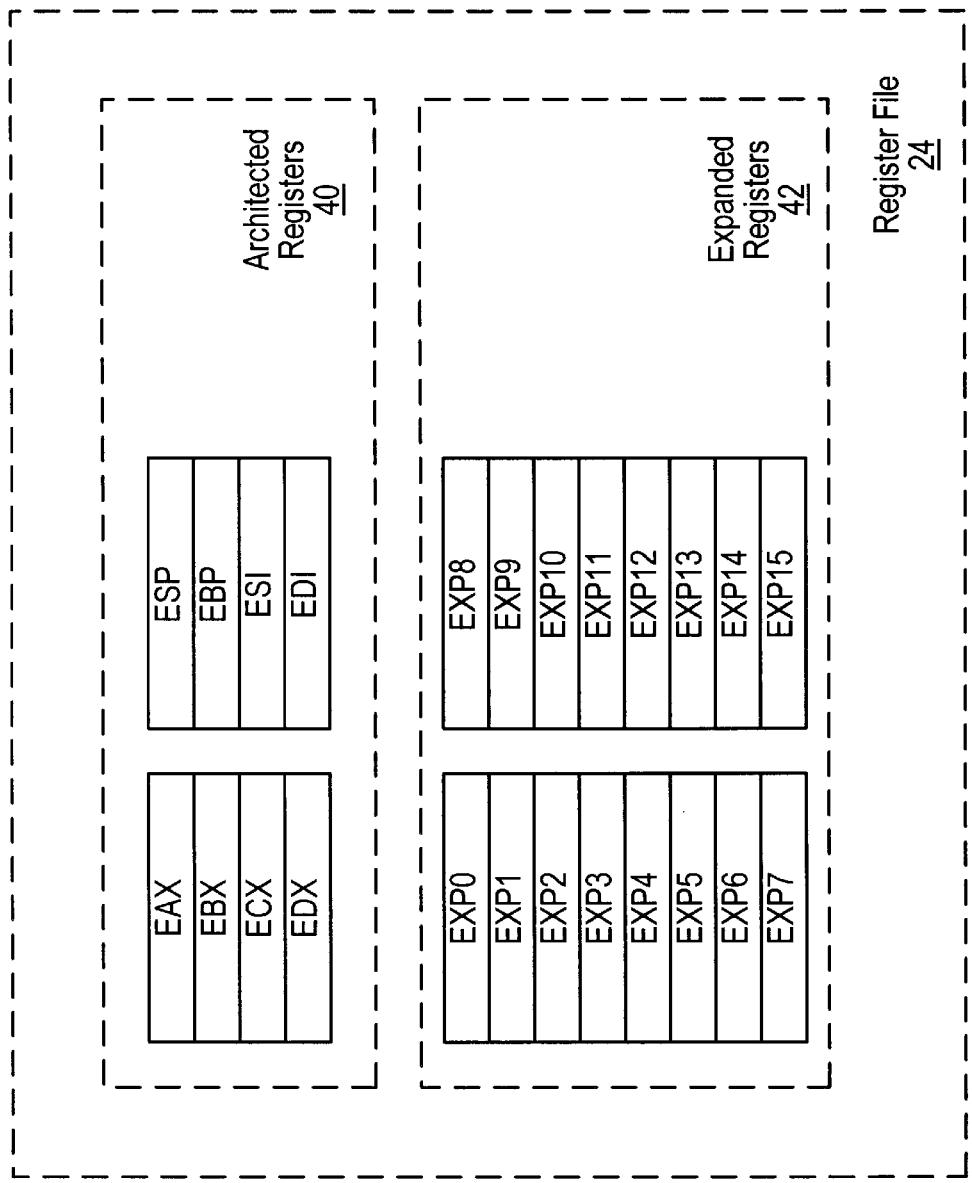
FIG. 2 is a block diagram of one embodiment of the register file shown in FIG. 1.

Turning now to FIG. 2, a block diagram of one embodiment of register file 24 is shown. Register file 24 includes a set of architected registers 40 and a set of expanded registers 42. Architected registers 40 are illustrated in FIG. 2 as the architected registers specified by the x86 microprocessor architecture. Other architectures may be employed in other embodiments.

Expanded registers 42 are the memory-mapped registers employed by microprocessor 10. Any number of expanded registers maybe defined, including more or fewer than the number shown in FIG. 2. Like architected registers 40, expanded registers 42 may be coded as source or destination operand specifiers for instructions. Expanded registers 42 may be defined as having any desirable size (e.g. number of bits). For example, expanded registers 42 may comprise 32 bits to match the size of architected registers 40 as shown in FIG. 2. Alternatively, 64 bits may be desirable, for example.

Both expanded registers 42 and architected registers 40 are accessible using a set of read ports and write ports (not shown). The read ports each provide a value identifying one of architected registers 40 or expanded registers 42, and a corresponding value is provided by register file 24 upon the read port. Write ports are used to update architected registers 40 and expanded registers 42. Reorder buffer 32 provides the value identifying the register to be updated upon the write port, as well as the update value to be stored into the register.

Figure 3:
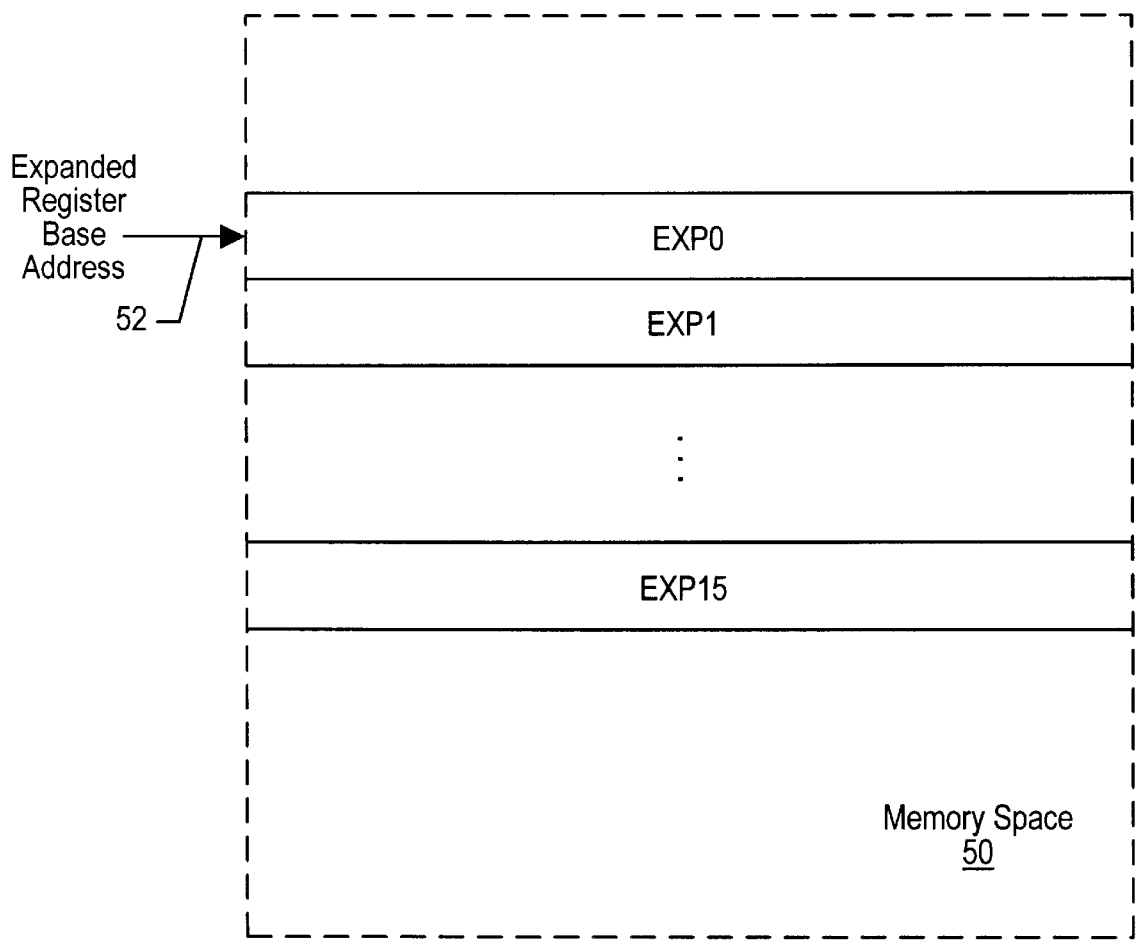
FIG. 3 is a diagram illustrating a memory space of a microprocessor including storage for a set of registers shown in FIG. 2.

Turning next to FIG. 3, a memory space 50 defined by the microprocessor architecture employed by microprocessor 10 is shown. Memory space 50 may be the entire addressable physical memory space employed by microprocessor 10. Alternatively, memory space 50 may be a portion of the addressable physical memory space assigned to a program executing upon microprocessor 10. Still further, memory space 50 may be a virtual address space corresponding to the program. In one embodiment in which microprocessor 10 employs the x86 microprocessor architecture, memory space 50 is a data segment assigned to the program being executed.

Within memory space 50, beginning at a base address indicated by arrow 52, is a set of consecutive memory locations labeled EXP0, EXP1, etc., through EXP15. Each memory location corresponds to the expanded register having the same label as shown in FIG. 2. Because each expanded register is assigned to a memory location within memory space 50, storage locations within the context save area assigned to the program need not be allocated for the expanded registers. The memory location assigned to the register includes a number of bytes sufficient to store the register contents. For example, if the expanded registers are 32 bits each, each memory location is 32 bits (or 4 bytes).

The base address of the memory to which the expanded registers are mapped may be determined in a variety of ways. For example, the base address may be stored in one of architected registers 40. Microprocessor 10 may be configured to read that architected register in order to determine the base address during context save operations. During context restore operations, microprocessor 10 may be configured to restore the architected registers corresponding to the context first, then determine the base address of the expanded registers in order to restore those expanded registers. Alternatively, the base address may be a fixed address assigned by microprocessor 10. Still further, the base address could be stored in a model specific register within MSR unit 26.

Figure 4:
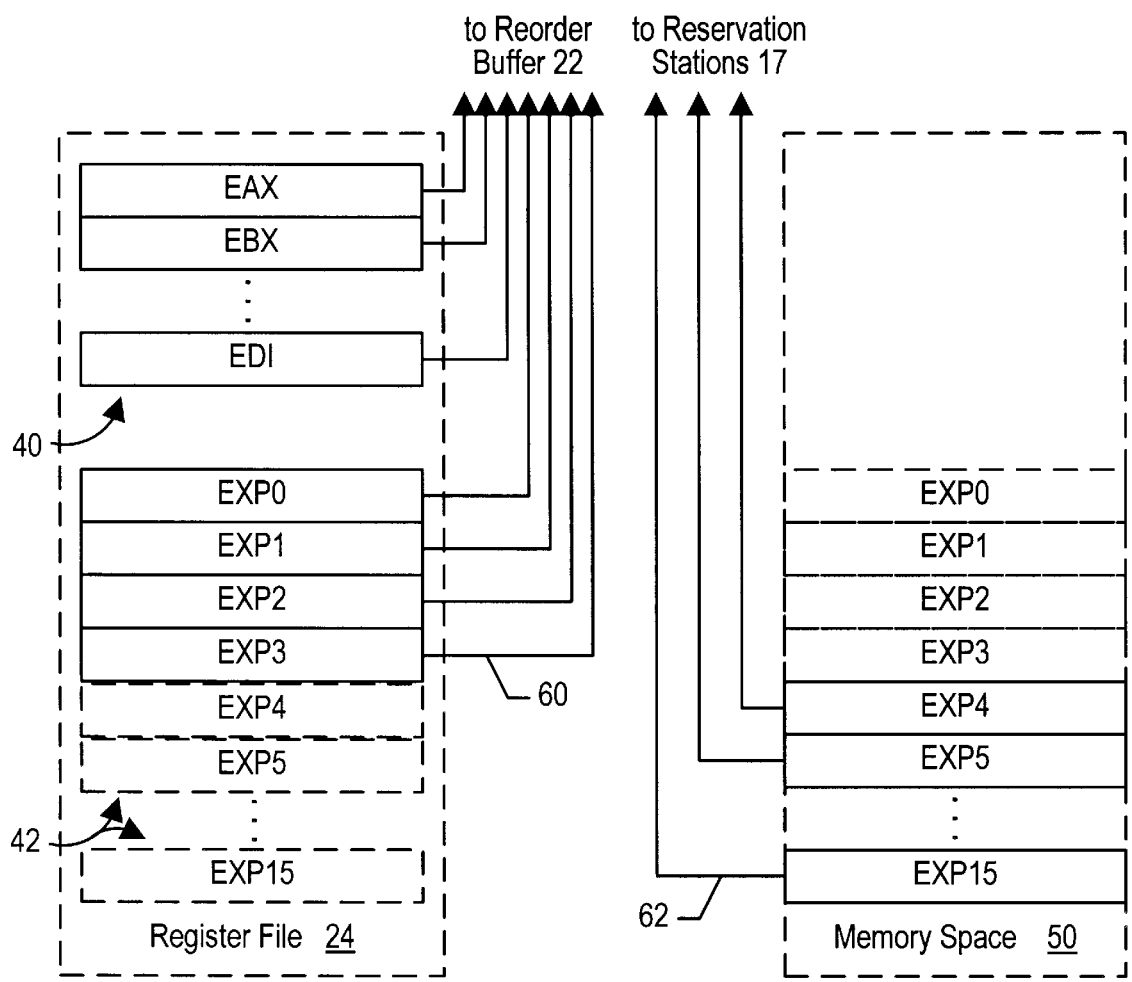
FIG. 4 is a diagram illustrating provision of operands from a register file or memory according to one embodiment of a register file which partially implements a set of registers shown in FIG. 3.

Turning next to FIG. 4, a block diagram illustrating operation of an embodiment of register file 24 is shown in which the number of expanded registers 42 which are implemented with register file 24 are less than the number of defined expanded registers. For example, register file 24 is shown in FIG. 4 as implementing expanded registers EXP0–EXP3 (shown as solid blocks within register file 24). The remaining expanded registers EXP4–EXP15 are illustrated as dotted blocks within register file 24 because these registers are not implemented in the embodiment of FIG. 4. In various embodiments, register file 24 may implement any number of expanded registers. Register file 24 implements all of the architected registers 40.

The embodiment of register file 24 shown in FIG. 4 allows for a relatively large number of expanded registers to be defined by microprocessor 10, without implementing all of the expanded registers. Subsequent implementations of microprocessor 10 may implement more, fewer, or even all of the defined expanded registers. Still further, the number of expanded registers in use may be specified by a particular program by storing the number in an architected register, an MSR, a memory location, or other means. Alternatively, a fixed number of expanded registers may be considered to be in use at any given time.

Those registers implemented by register file 24 (including architected registers 40 and the implemented ones of expanded registers 42) are accessed within register file 24 by decode unit 16 upon decode of instructions which specify those registers. Register file 24 provides the values stored in the implemented registers to reorder buffer 22, which routes the values to reservation stations 17 if renamed values for the registers are not provided within reorder buffer 22. The renamed values correspond to instructions which have previously been dispatched but have not yet stored results into register file 24. Arrow 60, for example, illustrates provision of the register value from expanded register EXP3 to reorder buffer 22.

Operands corresponding to expanded registers 42 which are not implemented by register file 24 are provided from the corresponding memory locations within memory space 50. Storage locations assigned to unimplemented expanded registers 42 (illustrated within memory space 50 as solid blocks) are actively used as the source for operands having an operand specifier corresponding to the unimplemented expanded register. In other words, the memory location (whether stored in data cache 14 or the main memory subsystem) is accessed each time the corresponding expanded register is used as an operand. For example, arrow 62 illustrates provision of the operand corresponding to expanded register EXP15 from memory space 50. Dotted blocks within memory space 50 are the memory locations corresponding to implemented expanded registers. These memory locations are used for saving the corresponding implemented expanded registers at a context switch, but are not actively used to source or receive operands during instruction execution within the context.

Operands provided from memory space 50 are provided to reservation stations 17. Generally, decode unit 16 determines that an expanded register coded as an operand of an instruction is one of the unimplemented expanded registers. Decode unit 16 generates load/store memory operations for the operands, and dispatches these memory operations to load/store unit 20 in a manner similar to reading memory operands for other instructions. The address operands used to produce the address of the operand are the base address (e.g. an architected register value or a fixed address provided as a constant value) and an offset determined by decode unit 16 from the register number. The offset may be the size of the register in bytes multiplied by the register number, for example, Therefore, if the expanded registers are 32 bits (4 bytes) each, then the offset for EXP0 is 4*0=0; the offset for EXP1 is 4*1=4; etc. Load/store unit 20, upon performing load memory operations for unimplemented expanded registers used as source operands, provides the operands to reservation stations 17. If the destination operand is an unimplemented expanded register, load/store unit 20 receives the instruction execution result upon result buses 30 and performs the corresponding store memory operation.

Figure 5:
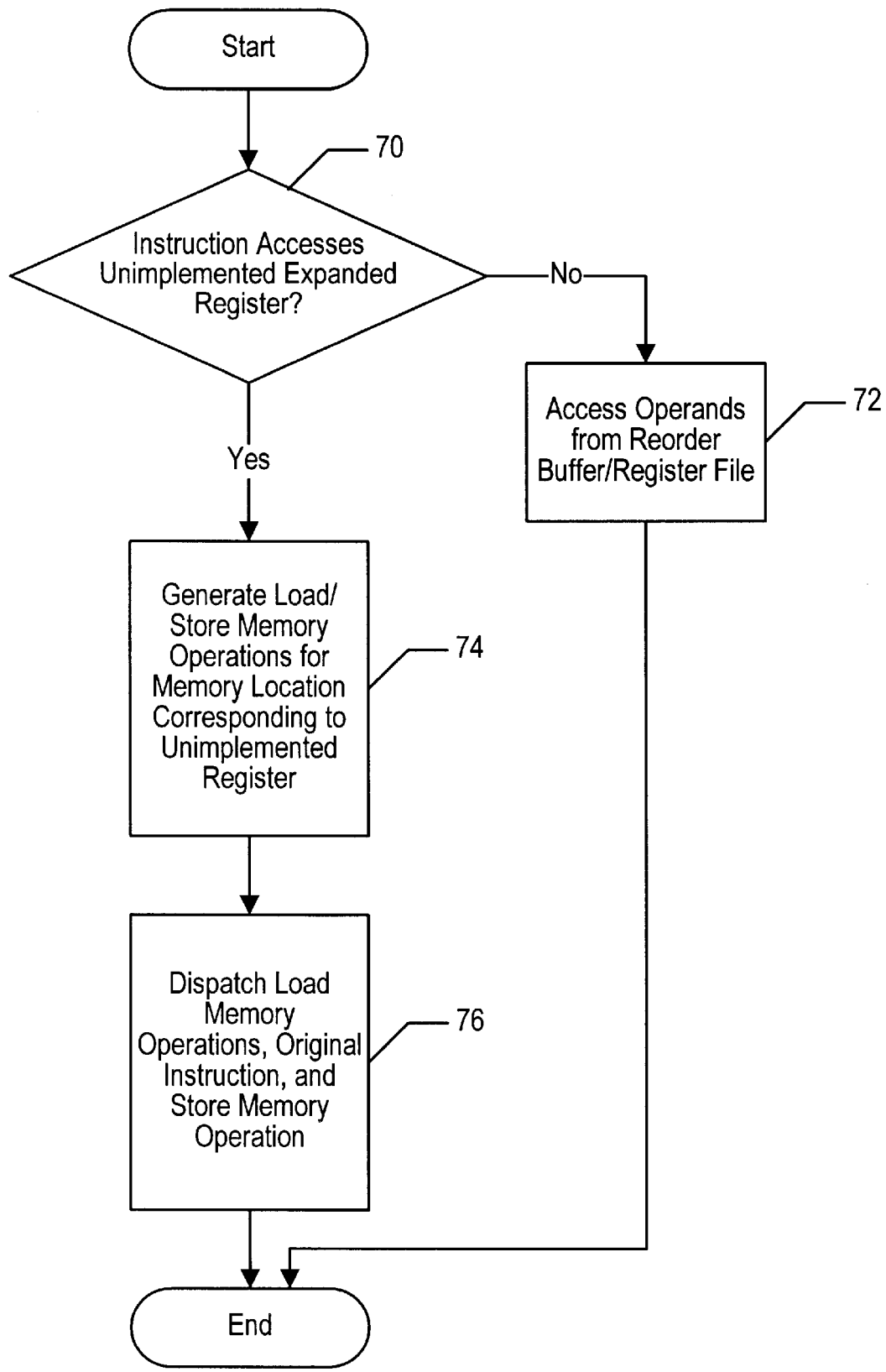
FIG. 5 is a flowchart illustrating operation of one embodiment of a decode unit employed with the embodiment of the register file shown in FIG. 4.

Turning now to FIG. 5, a flowchart illustrating operation of one embodiment of decode unit 16 employed with an embodiment of register file 24 which implements fewer than the total number of expanded registers is shown. While the steps shown in FIG. 5 are serially provided for ease of illustration, the steps may be performed in any suitable order and may be performed in parallel by combinatorial logic.

For each instruction decoded by decode unit 16, decode unit 16 determines if the instruction accesses an unimplemented expanded register (decision block 70). If the instruction does not access an unimplemented expanded register, decode unit 16 reads the operands from register file 24/reorder buffer 22 (step 72). On the other hand, if decode unit 16 does access one or more unimplemented expanded registers, decode unit 16 generates load/store memory operations to the memory location corresponding to the unimplemented expanded registers used as operands of the instruction (step 74). Architected register operands, implemented expanded register operands, and address operands for the load/store memory operations are read from register file 24/reorder buffer 22. The generated load memory operations for source operands (if any) are dispatched to reservation station 17C. Additionally, the original instruction is dispatched to reservation station 17A–17B as determined by the operation performed in response to the instruction. Finally, the generated store memory operation for the destination operand (if any) is dispatched to reservation station 17C (step 76).

As used herein, a register is accessed by an instruction (i.e. in response to fetching an instruction) if the contents of the register are either read or written in response to the instruction. The register is read for a source operand (i.e. the source operand is transferred from the register to the unit storing the instruction) or written for a destination operand (i.e. the destination operand is stored into the register).

Figure 6:
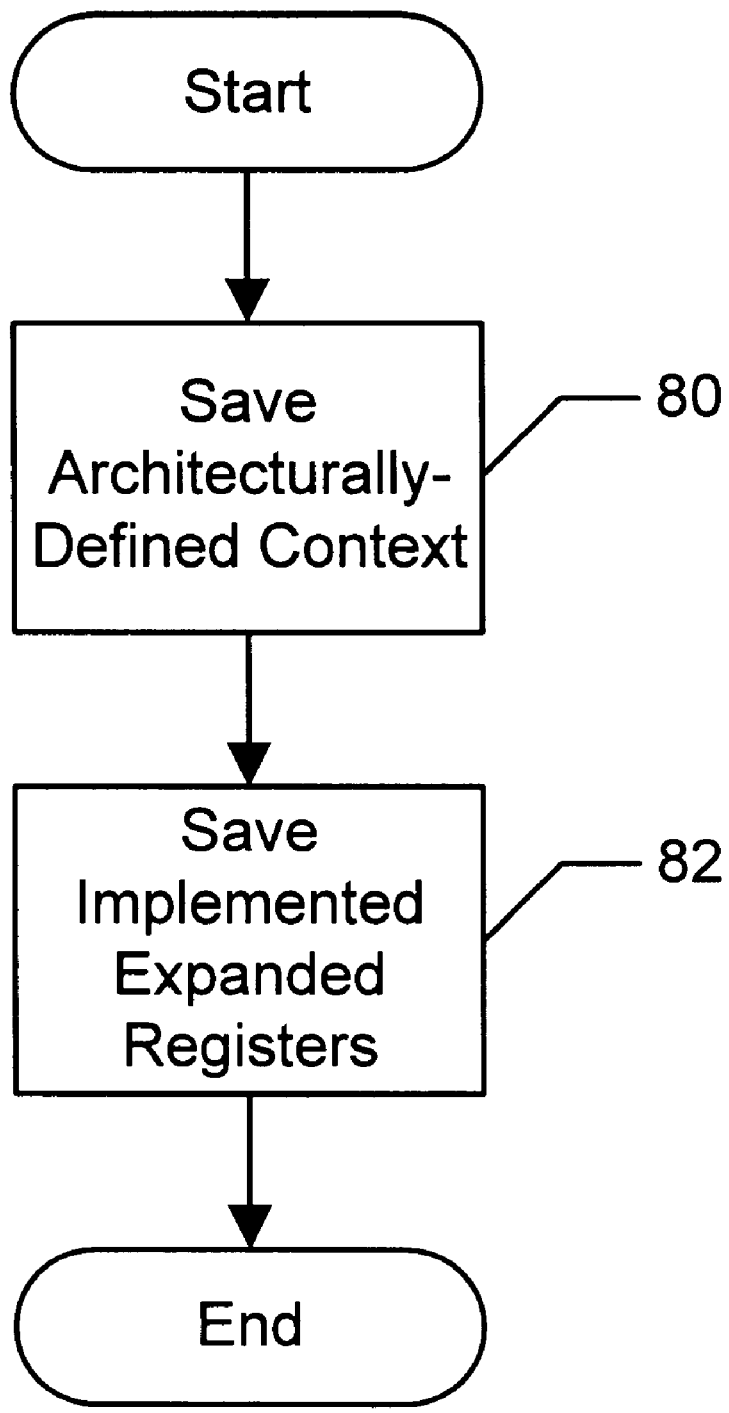
FIG. 6 is a flowchart illustrating operation of one embodiment of a microcode unit shown in FIG. 1 employed with the embodiment of the register file shown in FIG. 4.

Turning next to FIG. 6, a flowchart illustrating the operation of one embodiment of microcode unit 28 during a context save operation is shown. It is noted that, in other embodiments, context saves may be performed in dedicated hardware instead of by microcode unit 28. Microcode unit 28 saves the architecturally-defined context (including the architected registers within register file 24) to the context save area (step 80). Additionally, microcode unit 28 saves the implemented expanded registers to the corresponding memory locations using the base address and offsets corresponding to the registers (step 82).

It is noted that, even if software (e.g. the operating system) is responsible for saving the architected context during context switches, microcode unit 28 (or context save hardware) saves the implemented expanded registers. The operating system need not be changed to employ the expanded registers (or a subset thereof). It is further noted that context restores may be performed in a similar manner. However, if the base address of the memory storing the expanded registers is stored in an architected registers, microcode unit 28 is configured to restore the architected registers prior to restoring the expanded registers. In this manner, the base address may be determined.

Figure 7:
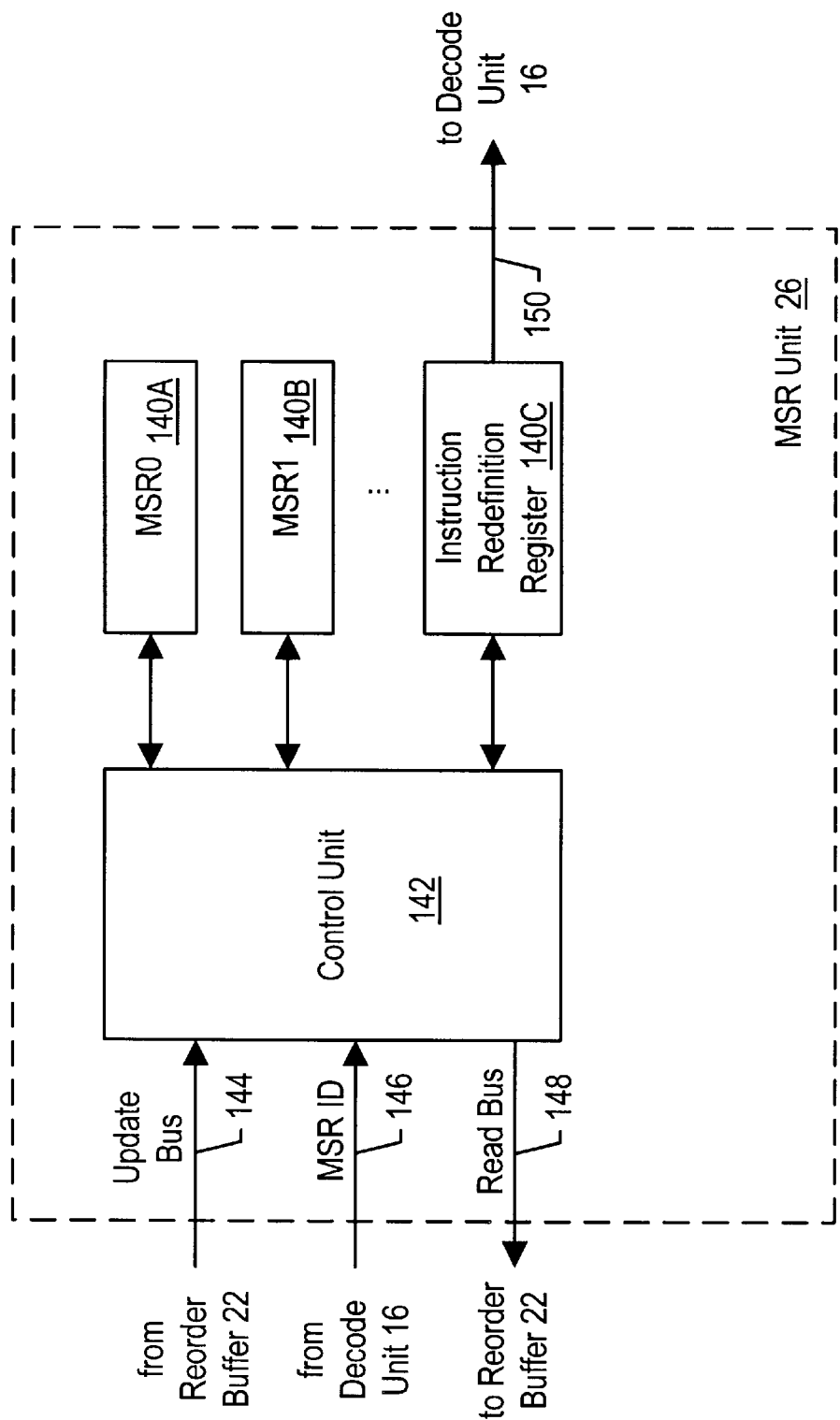
FIG. 7 is a block diagram of one embodiment of a model specific register unit shown in FIG. 1.

Turning next to FIG. 7, a block diagram of one embodiment of MSR unit 26 is shown. MSR unit 26 includes a plurality of MSRs 140A, 140B, etc. One of MSRs 140 is shown as MSR 140C, which is labeled "instruction redefinition register" in FIG. 7. The instruction redefinition register is the MSR assigned to store instruction redefinition information. Although MSR 140C will be referred to herein as instruction redefinition register 140C, it is noted that instruction redefinition register 140C is an MSR. In other words, instruction redefinition register 140C is accessed using the read MSR and write MSR instructions (e.g. RDMSR and WRMSR in embodiments employing the x86 microprocessor architecture). One of the operands of the read MSR and write MSR instructions is a value (the MSR ID) which selects one of MSRs 140 for access. One value of the MSR ID selects MSR 140C.

A control unit 142 is shown in FIG. 7 as well. Control unit 142 is coupled to each of MSRs 140 for accessing and updating (i.e. reading and writing) MSRs 140 in response to read MSR and write MSR instructions. Control unit 142 is coupled to an update bus 144 from reorder buffer 22, an MSR ID bus 146 from decode unit 16, and a read bus 148 to reorder buffer 22.

Update bus 144 is used by reorder buffer 22 to convey an update value for an MSR, as well as an MSR ID identifying the MSR to be updated. Upon retirement of a write MSR instruction, reorder buffer 22 provides the update value generated according to execution of the write MSR instruction and the MSR ID provided as an operand of the write MSR instruction upon update bus 144. Control unit 142 updates the identified MSR 140 with the updated value.

When decode unit 16 decodes a read MSR instruction, decode unit 16 may detect the MSR ID and convey it to control unit 142 upon MSR ID bus 146. Control unit 142 accesses the identified MSR and provides the value stored in the identified MSR upon read bus 148 to reorder buffer 22. This process is similar to decode unit 16 conveying a register number to register file 24 and register file 24 providing the value stored therein to reorder buffer 22. Reorder buffer 22 either provides the value stored in the identified MSR or replaces the value with a tag or value stored in reorder buffer 22 if a dependency is detected therein.

Alternatively, the MSR ID may not be detectable by decode unit 16. For example, the RDMSR and WRMSR instructions defined by the x86 microprocessor architecture define the MSR ID as being stored in the ECX register. For such a case, MSR ID bus 146 may be coupled to execute units 18. Furthermore, read bus 148 may be part of result bus 30 in such a case.

It is noted that the write MSR instruction may be implemented as a serialized instruction (i.e. instructions prior to the write MSR instruction are completed before executing the write MSR instruction, and the write MSR instruction is completed before executing instructions subsequent to the write MSR instruction). If the write MSR instruction is serialized, then dependency checking for the MSR being read by the read MSR instruction may not be needed.

A write MSR instruction selecting instruction redefinition register 140C is used to enable instruction redefinition mode in microprocessor 10. The value stored into instruction redefinition register 140C determines which instructions are redefined, and which of the expanded registers are to be accessed in response thereto. For this embodiment, the expanded registers may be grouped into groups of eight registers (i.e. the same number as the number of x86 architected registers). The register numbers used in the redefined instructions are mapped to the corresponding expanded registers by decode unit 16. The read MSR instruction may be used to examine the contents of instruction redefinition register 140C and thereby determine which of the added instructions (corresponding to the non-architecturally defined operations) have been activated.

According to one embodiment, a redefinition enable flag is stored in the status flags register employed by microprocessor 10. The redefinition enable flag is enabled to enable the use of the added instructions via instruction redefinition mode. The redefinition enable flag may be implicitly enabled by microprocessor 10 when a write MSR instruction is performed to instruction redefinition register 140C and at least one of the redefinable instructions is selected to be redefined. Similarly, the redefinition enable flag may be implicitly disabled when a write MSR instruction is executed which defines all redefinable instructions to perform their architecturally defined operations. Alternatively, application programs may be required to contain an explicit enable and disable of the redefinition enable flag.

A bus 150 is coupled between instruction redefinition register 140C and decode unit 16. Bus 150 conveys the values stored in instruction redefinition register 140C to decode unit 16. In this manner, decode unit 16 may determine which decoded instruction to produce upon decode of a redefinable instruction.

Figure 8:
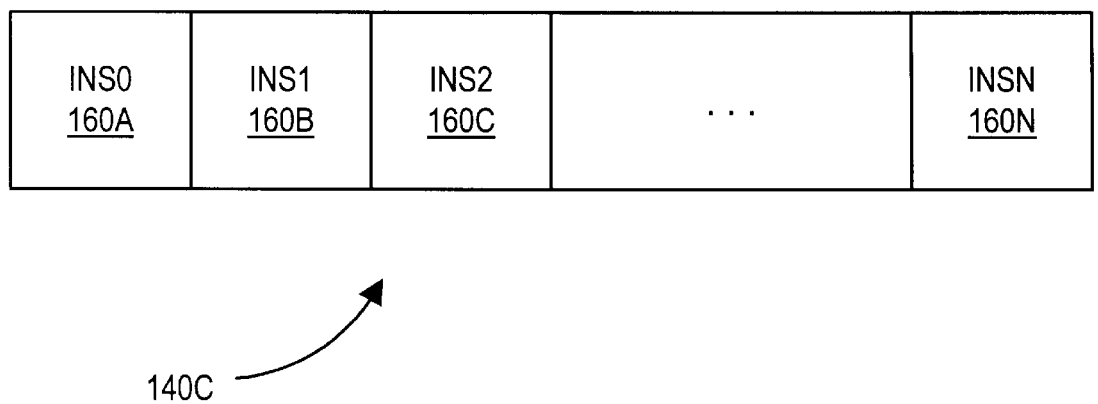
FIG. 8 is a diagram illustrating one embodiment of an instruction redefinition register shown in FIG. 7.

Turning next to FIG. 8, a diagram illustrating the contents of one embodiment of instruction redefinition register 140C is shown. As illustrated in FIG. 8, instruction redefinition register 140C stores multiple fields 160A, 160B, 160C, etc., through 160N. A different field 160A–160N corresponds to each of the redefinable instructions. The field 160A–160N corresponding to a particular redefinable instruction stores the operation selected by the application for performance in response to that particular redefinable instruction. One of the encodings of the field 160A–160N indicates that the instruction should access the architecturally defined registers. Other encodings of the field 160A–160N select groups of expanded registers for access.

In one embodiment, each field 160A–160N is a bit. For this embodiment, each redefinable instruction may be defined to access either architecturally defined registers or one group of expanded registers. For example, when the bit is clear, the architecturally defined registers may be selected while, when the bit is set, the expanded registers may be selected.

In another embodiment, each field 160A–160N is a multiple bit value. One encoding of the multiple bits (e.g. each bit being clear) selects the architecturally defined registers for access by the corresponding instruction. Other encodings select different groups of the expanded registers.

In yet another embodiment, some fields 160A–160N may be a single bit while other fields 160A–160N may be multiple bits. Any combination of field sizes may be employed according to various embodiments of microprocessor 10. Generally speaking, a "field" comprises at least one bit. The bits included in the field are assigned a specific interpretation as a whole. For example, fields 160A–160N are interpreted as specifying the operation to be performed in response to the corresponding instruction.

In still another embodiment, each field 160A–160N may store opcode information identifying the instruction represented by that field as well as a value indicating the nature of the redefinition. Such an embodiment may provide enhanced flexibility by allowing an application program to select the redefinable instructions instead of preselecting the redefinable instructions during the design of microprocessor 10.

According to one particular embodiment, the bits of opcode information included within a field 160A–160N include: eight bits comprising the opcode byte, a bit indicating whether or not a "0F" prefix byte is included, three bits of opcode extension from the first register field of the addressing mode (MOD R/M) byte, and two bits from the "mod" field of the MOD R/M byte. It is noted that, while fourteen bits are used as an example of opcode information which may be stored by embodiments of microprocessor 10 employing the x86 microprocessor architecture, different embodiments may employ more or different bits and may store similar or different opcode information.

An example of using instruction bits other than the opcode byte to identify a redefinable instruction is the use of illegal instruction encodings as the redefinable instruction. Since the instruction encodings are illegal, they may be redefined without loss of any original functionality. For example, the LDS, LES, etc. instructions of the x86 microprocessor architecture require a memory operand. Therefore, encodings of the MOD R/M byte which indicate the operand is a register operand are illegal encodings. These encodings may be specified as redefinable instructions.

Figure 9:
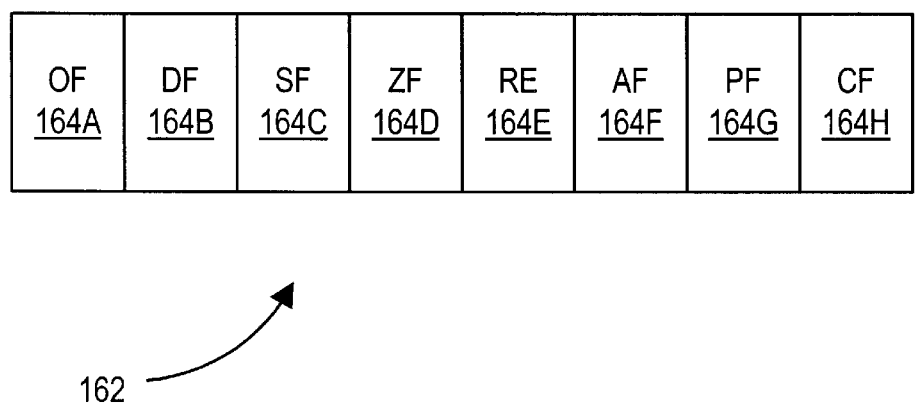
FIG. 9 is a diagram illustrating one embodiment of a flags register employed by one embodiment of the microprocessor shown in FIG. 1.

Turning now to FIG. 9, diagram illustrating the contents of a status flags register 162 is shown. Status flags register 162 as illustrated in FIG. 9 is compatible with the x86 microprocessor architecture. Other embodiments of status register 162 may be employed to be compatible with other microprocessor architectures. As shown in FIG. 9, status flags register 162 includes status flags 164A–164H.

Generally speaking, a status flags register is used to store an indication of certain events which may occur during the execution of instructions. The status flags may be tested by conditional branch instructions, for example, to determine if the conditional branch instruction should be taken or not taken. Still further, status flags may be used as input operands to instructions. For example, the carry flag may be used as an input operand to an addition instruction. As another example, DF flag 164B indicates whether string type instructions should increment their addressing register operand or decrement their addressing register operand.

RE flag 164E is the redefinition enable flag referred to above. Since status register 162 is automatically saved during context switches, the information concerning whether or not instruction redefinition is enabled within a particular context is automatically saved via RE flag 164E. Advantageously, the instruction redefinition mode is restored upon return to the particular context. Additionally, the state of RE flag 164E upon initiating a context switch may be used as a signal to store the contents of instruction redefinition register 140C in a predetermined location for restoration upon return to the particular context. Upon return to the particular context, the state of RE flag 164E as restored into status register 162 can similarly be used as a signal to reload the instruction redefinition register 140C from the predetermined location. Microcode unit 28 may be employed to perform context switches, and may therefore be programmed to detect the setting of RE flag 164E and perform additional save and restore operations accordingly. Therefore, the addition of RE flag 164E and the added instructions enabled thereby are transparent to operating system software. Only the application program using the added instructions and microprocessor 10 need be aware of the added instructions.

Decode unit 16 is coupled to receive RE flag 164E in addition to the contents of instruction redefinition register 140C. If RE flag 164E indicates that instruction redefinition is disabled, decode unit 16 ignores the values stored in instruction redefinition register 140C and produces a decoded instruction for each redefinable instruction which causes the corresponding architecturally defined operation to occur. If RE flag 164E indicates that instruction redefinition is enabled, decode unit 16 produces either a first decoded instruction causing the architecturally defined registers to be used or a second decoded instruction causing a different operation to occur in response to decoding a redefinable instruction (depending upon the corresponding field 160A–160N of instruction redefinition register 140C).

OF flag 164A is the overflow flag defined by the x86 microprocessor architecture. Similarly, DF flag 164B is the direction flag, SF flag 164C is the sign flag, ZF flag 164D is the zero flag, AF flag 164F is the auxiliary carry flag, PF flag 164G is the parity flag, and CF flag 164H is the carry flag as defined by the x86 microprocessor architecture. It is noted that the status flags register in the x86 microprocessor architecture is referred to as the EFLAGS register. The EFLAGS register may additionally store system flags (not shown). It is noted that status flags register 162 may be located anywhere within microprocessor 10. A suitable location may, for example, be reorder buffer 22.

Figure 10:
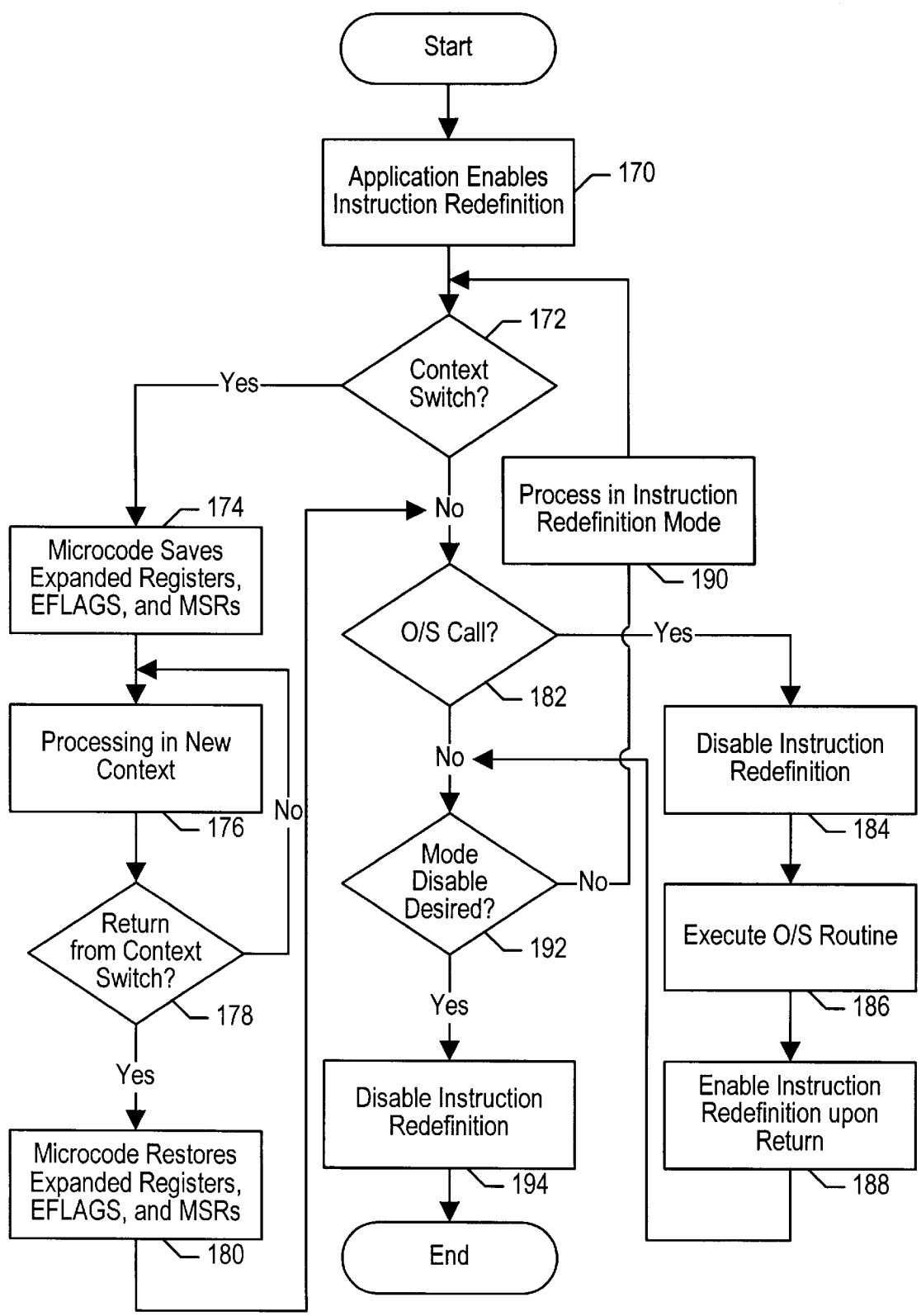
FIG. 10 is a flowchart illustrating operation of one embodiment of the microprocessor shown in FIG. 1 implementing instruction redefinition via model specific registers.

Turning now to FIG. 10, a flowchart is shown illustrating usage of the instruction redefinition mechanism as described above. The usage as shown in FIG. 10 illustrates a combined hardware and application program operation, wherein the application program uses the added instructions made possible through instruction redefinition. The instruction redefinition mechanism becomes activated (step 170) when an application program enables instruction redefinition. Step 170 includes updating instruction redefinition register 140C, and may include updating status register 162 to place RE flag 164E in an enabled state if the update is not implicit. Upon completion of step 170, microprocessor 10 begins executing the redefinable instructions as indicated by the value stored in instruction redefinition register 140C.

If microprocessor 10 experiences a context switch (decision block 172), microcode unit 28 is activated to save the context of the application (step 174). Since the status register is part of the context, the status register is saved into the context storage location identified by the microprocessor architecture employed by microprocessor 10. Additionally, microcode unit 28 examines that status of RE flag 164E. If instruction redefinition is enabled, microcode unit 28 stores the contents of instruction redefinition register 140C into a predefined storage location. The predefined storage location may be a memory location assigned to the application, for example. Alternatively, the application may dedicate registers within register file 24 to store the contents of instruction redefinition register 140C. The contents of instruction redefinition register 140C are thereby automatically saved upon a context switch. Additionally, microcode unit 28 sets the value in instruction register 140C to a default value which maps each redefinable instruction to its architecturally defined operation. Still further, microcode unit 28 stores the expanded registers into the corresponding set of consecutive memory locations.

Processing in the new context may subsequently be performed (step 176), until a return to the application program's context is desired (decision block 178). Processing in the new context is performed with instruction redefinition disabled, unless specifically enabled within the new context. Upon return to the application program, microcode unit 28 restores the application program's context (step 180). Restoring the application program's context includes the value in status flags register 162. Additionally, microcode unit 28 examines RE flag 164E upon restoring status flags register 162. If RE flag 164E indicates that instruction redefinition is enabled, then the contents of instruction redefinition register 140C are restored from either the predefined storage location or the dedicated registers, depending upon the embodiment. Finally, the expanded registers are restored from the corresponding memory locations.

An additional consideration in the use of instruction redefinition by the application program is the use of operating system routines by the application program. It is desirable to allow instruction redefinition to be utilized by the application program, but to disable instruction redefinition when the operation system executes. In this manner, microprocessor 10 may employ instruction redefinition without requiring the operating system to be rewritten. Particularly, if privileged instructions are selected as redefinable instructions, the operating system may need to execute the privileged instruction within the called operating system routine.

Disabling instruction redefinition mode upon context switches effects the disablement of instruction redefinition mode when the operating system begins executing via a context switch. However, application programs often call operating system service routines. These calls may not be performed via a context switch. One method for handling calls to operating system routines is illustrated in FIG. 10. If an operating system call is desired (decision block 182), then the application program disables instruction redefinition mode (step 184). RE flag 164E is set to a disabled state. Furthermore, the application program may store the expanded registers to the corresponding memory locations prior to the operating system call. Subsequently, the application program calls the desired operating system routine (step 186). Upon return from the operating system routine, the application re-enables instruction redefinition mode (step 188). In other words, the application program sets RE flag 164E to an enabled state. If the application program stored the expanded registers to the corresponding memory locations, the expanded registers are restored from the corresponding memory locations.

The application program is processed by microprocessor 10 in instruction redefinition mode (step 190) until the application program determines that instruction redefinition mode is no longer desired (decision block 192). Upon determining that instruction redefinition mode is no longer desired, the application program disables instruction redefinition mode (step 194).

Figure 11:
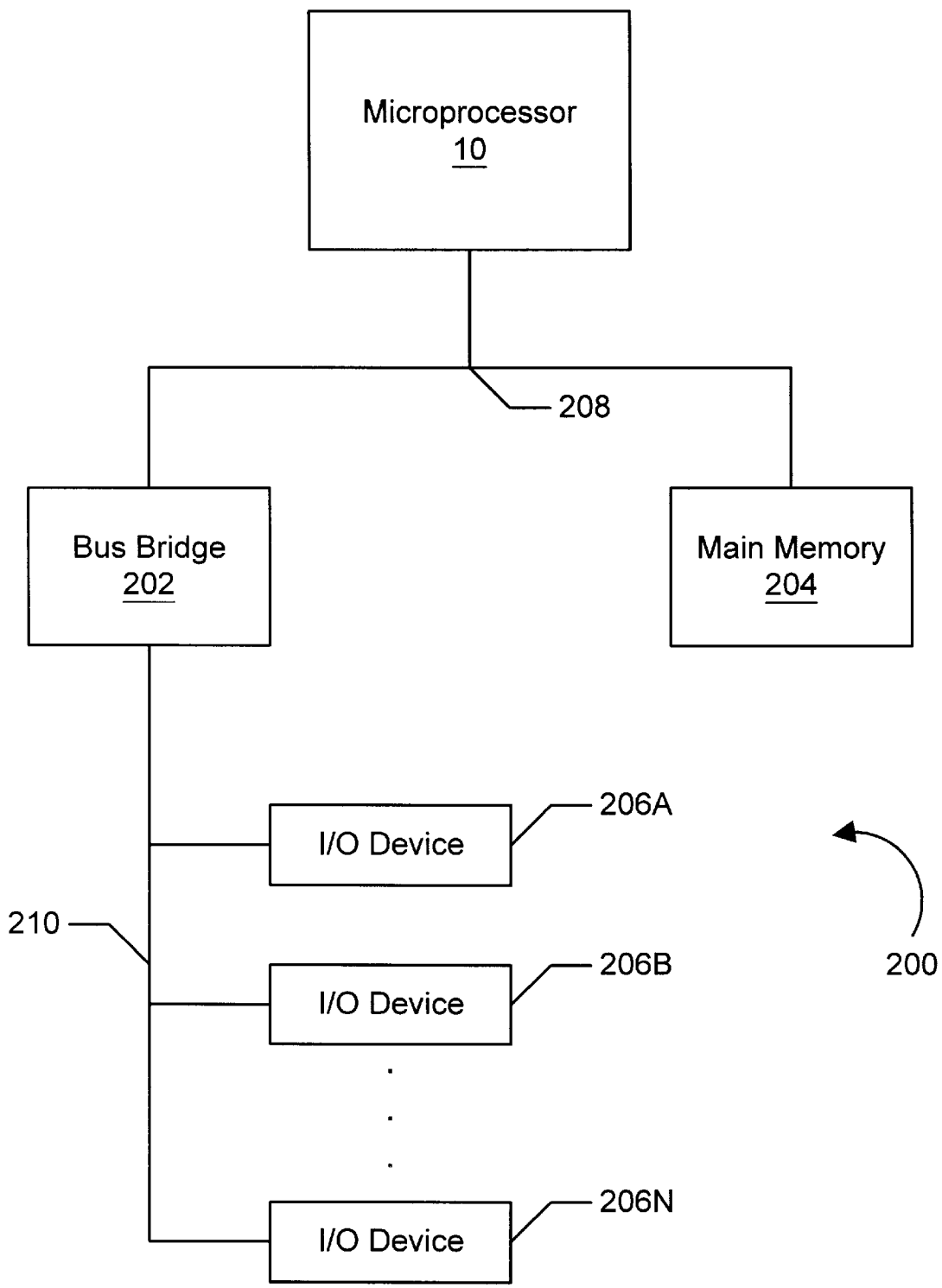
FIG. 11 is a block diagram of one embodiment of a computer system including the microprocessor shown in FIG. 1.

Turning now to FIG. 11, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 11 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

FIG. 12 is a diagram illustrating an exemplary context save area 250. Context save area 250 is located in memory by a context base address (e.g. arrow 252) defined by the microprocessor architecture employed by microprocessor 10. The exemplary context save area 250 corresponds to the x86 microprocessor architecture, although other architectures may be used. As shown in FIG. 12, context save area 250 includes storage for architected registers 40, as well as status register 162 and additional architected context as defined by the x86 microprocessor architecture.

In accordance with the above disclosure, a microprocessor has been described which employs more registers than those defined by the microprocessor architecture employed by the microprocessor. The additional registers are memory-mapped, thereby providing storage for the registers if a context switch occurs. The storage is supplied outside of the architecturally defined context save area, and therefore the addition of the registers can be transparent to the operating system software. Advantageously, more operands may be stored in registers thereby allowing for reduced operand access latency.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   a register file including a first set of registers and a second set of registers, wherein said second set of registers are mapped to a set of consecutive memory locations external to said register file and within a memory space of said microprocessor; and
   a control unit configured, during a context switch, to store a contents of said first set of registers into a context save area defined by a context base address, wherein said control unit is further configured, during a context switch, to store a contents of said second set of registers into said set of consecutive memory locations, wherein said set of consecutive memory locations are separate from said context save area.

2. The microprocessor as recited in claim 1 wherein said control unit comprises a microcode unit.

3. The microprocessor as recited in claim 1 wherein said set of consecutive memory locations is defined by a first base address locating a first one of said set of consecutive memory locations within said memory space.

4. The microprocessor as recited in claim 3 wherein said first base address is stored in one of said first set of registers.

5. The microprocessor as recited in claim 1 wherein said control unit is configured, during a return from said context switch, to restore said second set of registers from said set of consecutive memory locations.

6. The microprocessor as recited in claim 5 wherein said control unit is further configured, during said return from said context switch, to restore said first set of registers from said context save area.

7. The microprocessor as recited in claim 1 wherein said set of consecutive memory locations includes storage for a third set of registers in addition to storage for said second set of registers.

8. The microprocessor as recited in claim 7 wherein said third set of registers are not implemented within said register file.

9. The microprocessor as recited in claim 8 further comprising a decode unit configured, upon decode of an instruction which accesses one of said third set of registers, to generate a memory operation to a corresponding one of said set of consecutive memory locations, thereby providing an operand corresponding to said one of said third set of registers.

10. A microprocessor comprising:
    a register file including a first set of registers and a first portion of a second set of registers, wherein said second set of registers are mapped to a set of consecutive memory locations within a memory space of said microprocessor; and
    a decode unit coupled to said register file, wherein said decode unit is configured, upon decode of a first instruction coded to access one of said first portion of said second set of registers, to generate a read request to said register file for said one of said first portion of said second set of registers, and wherein said decode unit is further configured, upon decode of a second instruction coded to access one of a remaining portion of said second set of registers, to generate a memory operation having an address corresponding to one of said set of consecutive memory locations, said one of said set of consecutive memory locations corresponding to said one of said remaining portion of said second set of registers.

11. The microprocessor as recited in claim 10 wherein said memory operation comprises a load memory operation if said one of said remaining portion of said second set of registers stores a source operand of said second instruction.

12. The microprocessor as recited in claim 10 wherein said memory operation comprises a store memory operation if said one of said remaining portion of said second set of registers stores a destination operand of said second instruction.

13. The microprocessor as recited in claim 10 wherein said address is generated from a first base address identifying a first one of said consecutive memory locations and an offset corresponding to said one of said remaining portion of said second set of registers.

14. The microprocessor as recited in claim 10 further comprising a microcode unit coupled to said decode unit, wherein said microcode unit is configured to store said first portion of said second set of registers into corresponding ones of said set of consecutive memory locations upon a context switch.

15. The microprocessor as recited in claim 14 wherein said microcode unit is further configured to restore said first portion of said second set of registers from said corresponding ones of said set of consecutive memory locations upon a return from said context switch.

16. A method for accessing a set of memory-mapped registers in a microprocessor which implements a first portion of said set of memory-mapped registers and does not implement a remaining portion of said set of memory-mapped registers, comprising:
    decoding an instruction having an operand stored in one of said set of memory-mapped registers;
    accessing said one of said set of memory-mapped registers within said microprocessor in response to said decoding and further in response to said one of said set of memory-mapped registers being one of said first portion of said set of memory-mapped registers;
    generating a memory operation having an address of a corresponding memory location to which said one of said memory-mapped registers is mapped in response to said decoding said instruction and further in response to said one of said set of memory-mapped registers being one of said remaining portion of said set of memory mapped registers; and
    accessing said corresponding memory location in response to said memory operation.

17. The method as recited in claim 16 wherein said accessing said one of said set of memory-mapped registers within said microprocessor and said accessing said one of said set of memory-mapped registers from a corresponding memory location each comprise reading said one of said set of memory-mapped registers if said one of said set of memory-mapped registers comprises a source operand of said instruction.

18. The method as recited in claim 16 wherein said accessing said one of said set of memory-mapped registers within said microprocessor and said accessing said one of said set of memory-mapped registers from a corresponding memory location each comprise writing said one of said set of memory-mapped registers if said one of said set of memory-mapped registers comprises a destination operand of said instruction.

19. The method as recited in claim 16 wherein an address of said corresponding memory location is formed from a base address and an offset corresponding to said one of said set of memory-mapped registers.

20. The method as recited in claim 19 wherein said base address is stored in an architected register.

21. A microprocessor comprising:
a register file including a first set of registers and a second set of registers, wherein said second set of registers are mapped to a set of consecutive memory locations within a memory space of said microprocessor; and
a control unit configured, during a context switch, to store a contents of said first set of registers into a context save area defined by a context base address and to store a contents of said second set of registers into said set of consecutive memory locations, wherein said set of consecutive memory locations are separate from said context save area, and wherein said control unit is configured, during a return from said context switch, to restore said second set of registers from said set of consecutive memory locations.

22. The microprocessor as recited in claim 21 wherein said control unit comprises a microcode unit.

23. The microprocessor as recited in claim 21 wherein said set of consecutive memory locations is defined by a first base address locating a first one of said set of consecutive memory locations within said memory space.

24. The microprocessor as recited in claim 23 wherein said first base address is stored in one of said first set of registers.

25. The microprocessor as recited in claim 21 wherein said control unit is further configured, during said return from said context switch, to restore said first set of registers from said context save area.

26. The microprocessor as recited in claim 21 wherein said set of consecutive memory locations includes storage for a third set of registers in addition to storage for said second set of registers.

27. The microprocessor as recited in claim 26 wherein said third set of registers are not implemented within said register file.

28. The microprocessor as recited in claim 27 further comprising a decode unit configured, upon decode of an instruction which accesses one of said third set of registers, to generate a memory operation to a corresponding one of said set of consecutive memory locations, thereby providing an operand corresponding to said one of said third set of registers.

29. A method for accessing a set of memory-mapped registers in a microprocessor which implements a first portion of said set of memory-mapped registers and does not implement a remaining portion of said set of memory-mapped registers, comprising:
decoding an instruction having an operand stored in one of said set of memory-mapped registers;
accessing said one of said set of memory-mapped registers within said microprocessor in response to said one of said set of memory-mapped registers being one of said first portion of said set of memory-mapped registers; and
accessing said one of said set of memory-mapped registers from a corresponding memory location to which said one of said set of memory-mapped registers is mapped in response to said one of said set of memory-mapped registers being one of said remaining portion of said set of memory-mapped registers;
wherein said accessing said one of said set of memory-mapped registers within said microprocessor and said accessing said one of said set of memory-mapped registers from a corresponding memory location each comprise reading said one of said set of memory-mapped registers if said one of said set of memory-mapped registers comprises a source operand of said instruction.

30. The method as recited in claim 29 wherein said accessing said one of said set of memory-mapped registers within said microprocessor and said accessing said one of said set of memory-mapped registers from a corresponding memory location each comprise writing said one of said set of memory-mapped registers if said one of said set of memory-mapped registers comprises a destination operand of said instruction.

31. The method as recited in claim 29 wherein an address of said corresponding memory location is formed from a base address and an offset corresponding to said one of said set of memory-mapped registers.

32. The method as recited in claim 31 wherein said base address is stored in an architected register.

33. A computer system comprising:
a memory; and
a microprocessor coupled to said memory, said microprocessor including:
a register file including a first set of registers and a second set of registers, wherein said second set of registers are mapped to a set of consecutive memory locations within said memory; and
a control unit configured, during a context switch, to store a contents of said first set of registers into a context save area within said memory, said context save area defined by a context base address, and wherein said control unit is configured, during said context switch, to store a contents of said second set of registers into said set of consecutive memory locations, wherein said set of consecutive memory locations are separate from said context save area, and wherein said control unit is configured, during a return from said context switch, to restore said second set of registers from said set of consecutive memory locations.

34. The computer system as recited in claim 33 further comprising an input/output (I/O) device coupled to said microprocessor, wherein said I/O device is configured to communicate between said computer system and another computer system to which said I/O device is coupled.

35. The computer system as recited in claim 34 wherein said I/O device comprises a modem.

36. The computer system as recited in claim 33 wherein said set of consecutive memory locations is defined by a first base address locating a first one of said set of consecutive memory locations within said memory.

37. The computer system as recited in claim 36 wherein said first base address is stored in one of said first set of registers.

38. The computer system as recited in claim 33 wherein said control unit is further configured, during said return from said context switch, to restore said first set of registers from said context save area.

39. The computer system as recited in claim 33 wherein said set of consecutive memory locations includes storage for a third set of registers in addition to storage for said second set of registers, and wherein said third set of registers are not implemented within said register file.

40. The computer system as recited in claim 39 wherein said microprocessor further comprises a decode unit configured, upon decode of an instruction which accesses one of said third set of registers, to generate a memory operation to a corresponding one of said set of consecutive memory locations, thereby providing an operand corresponding to said one of said third set of registers.

* * * * *